United States Patent [19]

Inoue et al.

[11] Patent Number: 5,055,259
[45] Date of Patent: Oct. 8, 1991

[54] BLOODLESS BLOOD TYPING TRAINING KIT

[75] Inventors: Tsutomu Inoue, Fuchu; Kazuhiko Okamura, Fujisawa; Naoto Kawamura, Yamato; Hiroshi Tone, Yokohama; Rokuro Okamoto, Fujisawa, all of Japan

[73] Assignee: Sanraku Incorporated, Tokyo, Japan

[21] Appl. No.: 384,357

[22] Filed: Jul. 24, 1989

[30] Foreign Application Priority Data

Jul. 29, 1988 [JP] Japan .................................. 63-191174
May 30, 1989 [JP] Japan .................................. 1-138585

[51] Int. Cl.[5] ....................... G01N 31/00; G09B 23/00
[52] U.S. Cl. ......................................... 422/61; 422/73; 424/11; 434/276; 434/283; 434/298
[58] Field of Search ..................... 422/61, 73; 424/11; 434/276, 283, 298

Primary Examiner—Robert J. Warden
Assistant Examiner—Stephanie Blythe
Attorney, Agent, or Firm—Jordan and Hamburg

[57] ABSTRACT

This invention provides a blood typing training kit comprising a red blood cell model and an antiserum model with no use of human blood in experiments for blood agglutination and in learning of blood typing, the red blood cell model being an easily available granule which can be suspended in water such as agarose bead, Sepharose, cellulose, Sephadex, cellulofine, alginate, tamarind polysaccharide, gelatin, xanthan gum, etc. or the saccharide- or protein-bound form thereof and the antiserum model being lectin, boric acid-containing liquid or immunoglobulin G.

5 Claims, No Drawings

BLOODLESS BLOOD TYPING TRAINING KIT

BACKGROUND OF THE INVENTION

This invention relates to model kits for learning blood typing principle comprising red blood cell models and antiserum models with no use of human blood, for use in experiments for blood agglutination and in learning of blood typing, the red blood cell models being easily available granules which can be suspended in water such as agarose bead, Sepharose, cellulose, Sephadex, cellulofine, alginate, tamarind polysaccharide, gelatin, xanthan gum, etc., or the saccharide- or protein-bound form thereof and the antiserum models being lectin, boric acid-containing liquid or immunoglobulin.

Blood typing is to be learned in biology in high school, wherein "the relationship among agglutinins based on ABO blood group system" and "the agglutination reaction" should be instructed according to the textbook and so on. However, since human blood has been used in the experiments, they may actually be instructed only at nearly half of high schools in Japan.

In the learning of blood typing human blood was taken and used as experimental materials, but the use of human blood in lessons at high school is not preferable as such blood is not easily available; blood-collecting from students would violate the medicinal affairs law; a great number of diseases infected via blood are known and in particular, AIDS and hepatitis B have become a social problem.

Thus, a training kit for carrying out experiments in blood typing without the use of real blood has been intensely desired in the field of school education, in particular in biological education in high school.

SUMMARY OF THE INVENTION

The object of the present invention is to provide a training kit in order to carry out blood typing experiments with no use of blood.

The inventors have studied eagerly to achieve the above object and found that lectins selectively react to natural or synthetic water-insoluble polymer in granule such as agarose, cellulose, Sephadex, cellulofine, alginate, etc. to cause agglutination and that water-insoluble saccharides in alkaline suspension also selectively react to boric acid-containing liquid, causing agglutination. The inventors also found that the granule bound with protein A or G selectively reacts to immunoglobulin, resulting in the agglutination; based on the above findings, we modeled the red blood cell agglutination on the basis of the aforementioned phenomena and utilized it for learning of blood agglutination and experiments of blood typing and thus, we achieved the blood typing training kit of the invention.

According to this invention, the combination of substances agglutinating each other is assumed as an agglutinating form between red blood cell and antiserum, and any two pairs assumed for red blood cell and antiserum models of A and B types may be selected. Thus, the two combinations are defined as A and B typing models, respectively.

The following four combinations are described in accordance with the invention.

1) A natural or synthetic water-insoluble polymer bound with a saccharide selected from mannose, glucose, maltose, isomaltose, gentiobiose and maltotriose, and a phytohemagglutinin in the third group of the Mäkelä's classification.
2) A natural or synthetic water-insoluble polymer bound with a saccharide selected from galactose or lactose, and a phytohemagglutinin in the second group of Mäkelä's classification.
3) A water-insoluble saccharide in alkaline suspension and boric acid-containing liquid.
4) A natural or synthetic water-insoluble polymer bound with protein A or G and immunoglobulin G.

O type blood model comprising the substance with no agglutination to antiserum, or a polymer itself or the epoxidated polymer, or the polymer bound with N-acetylgalactosamine, N-acetylglucosamine or N-acetylmannosamine, in addition to a polysaccharide in acid solution, is used in correspondence to the selected two typing models of A and B.

Furthermore, an AB type red blood cell model is to have both functional components of A and B typing models agglutinating the selected two antiserum models for A and B red blood cell models.

DESCRIPTION OF THE PREFERRED EMBODIMENTS

The invention consists of the following blood typing model kit including red blood cell models and antiserum models:

1. as A and B typing models, two combinations selected from the following combinations of red blood cell and antiserum models; (a) a red blood cell model of a natural or synthetic water-insoluble polymer bound with a saccharide selected from mannose, glucose, maltose, isomaltose, gentiobiose, maltotriose and an antiserum model of one or two or more phytohemagglutinins in the third group of Mäkelä's classification, (b) a red blood cell model of a natural or synthetic water-insoluble polymer bound with galactose or lactose and an antiserum model of one or two or more phytohemagglutinins in the second group of Mäkelä's classification, (c) a red blood cell model of a water-insoluble saccharide in alkaline suspension and an antiserum model of boric acid-containing liquid, (d) a red blood cell model of a natural or synthetic water-insoluble polymer bound with protein A or G and an antiserum model of immunoglobulin G;
2. as an O type red blood cell model, A and B typing models of the red blood cell and antiserum models in items 1(a) and (b) described above, and a natural or synthetic water-insoluble polymer or the epoxidated form thereof, or the polymer bound with a saccharide selected from N-acetylgalacyosamine, N-acetylglucosamine and N-acetylmannosamine.

as an AB type red blood cell model synthetic polymer bound with a saccharide selected from mannose, glucose, maltose, isomaltose and maltotriose and also bound with galactose or lactose;
3. as an O type red blood cell model, A and B typing models of the red blood cell and antiserum models in items 1(a) or (b) and (c) described above, and a natural or synthetic water-insoluble polymer in acidic suspension;

as an AB type red blood cell model, a natural or synthetic polymer in alkaline suspension, bound with a saccharide selected from mannose, glucose, maltose, isomaltose and maltotriose, in the case of using the combination 1(a) described above as an A typing model, as an AB type red blood cell model. a natural or synthetic polymer in alkaline suspension. bound with a saccharide selected from galactose or lactose, in the case of using the combination 1(b) described above as an A typing model;

4. as an O type red blood cell model, A and B typing models of the red blood cell and antiserum models in items 1(a) or (b) and (d) described above, and a natural or synthetic water-insoluble polymer or the epoxidated form thereof, or the polymer bound with a saccharide selected from N-acetylgalactosamine, N-acetylglucosamine and N-acetylmannosamine;

as an AB type red blood cell model, a natural or synthetic water-insoluble polymer bound with a saccharide selected from mannose, glucose, maltose, isomaltose, gentiobiose and maltotriose, in the case of using the combination 1(a) described above as an A typing model, as an AB type red blood cell model, a natural or synthetic water-insoluble polymer, bound with galactose or lactose and also with protein A or protein G, in the case of using the combination 1(b) described above as an A typing model; and 5. a natural or synthetic water-insoluble polymer being agarose. Sepharose. Sephadex. cellulofine, alginate, tamarind polysaccharide. gelatin. xanthan gum in any of the combinations described above.

As for the granule which can be suspended in water in accordance with the red blood cell model of the invention, a water-insoluble polymer such as agarose, Sepharose, cellulose, Sephadex, cellulofine, alginate, tamarind polysaccharide, gelatin, xanthan gum, etc. is used. These granules can be used as they are or in the form bound with saccharide or bound with protein A or G, depending upon the substance used in an antiserum model.

The above polymer is used in the form of alkaline suspension, which is also used in the case when using boric acid-containing liquid as an antiserum model.

Furthermore, in the case of using the red blood cell model bound with protein A or G, immunoglobulin is used as antiserum model.

The saccharides such as mannose. glucose. maltose, isomaltose. gentiobiose, maltotriose. etc., which may be bound to the water-insoluble polymer of the present invention, are the substances which selectively react to the phytohemagglutinins (referred to as lectin) among the third group of Mäkelä's classification to exhibit agglutination.

Galactose or lactose bound with a water-insoluble polymer selectively reacts to the lectins among the second group of Mäkelä's classification to exhibit agglutination.

As for the lectins among the third group of Mäkelä's classification, the following lectins derived from plants are included:

*Canavalia ensiformis. Lens culinaris. Pisum sativum Visia faba. Cytisus sessilifolisus. Laburnum alpinum, Cerastrium fomentosus. Ulex europeus, Triticum vulgaris.*

As for the lectins among the second group of Mäkelä's classification, the following lectins derived from plants are included:

*Arotocarpus integrifolia. Abrus precatorius. Agaricus bisporus, Arachis hypogaea, Bandeiraea simplicifolia, Bauhinia purpunea. Calpurina aurea, Crotalia aeggtiana, Fomes fomentarius, Glyclne max. Maakia amurensis, Phaseolus lunatas. Phaseolus vulgaris, Ricinus communis, Robinia pseudiacacia, Sophora Japonica, Wistarla flori-dumda, Vicia cracca. Maclura pomifera. Helix polmatia, and Solanum tuberosum.*

The substances which do not agglutinate with the antiserum model such as lectin, etc. and which are used as an O type red blood cell model of the blood typing training kit according to the present invention, are N-acetylglucosamine, N-acetylgalactosamine, N-acetylmannosamine, etc.

These substances are those which do not agglutinate with any lectin among the second and third groups of Mäkelä's classification.

For the binding of the above saccharides to the above polymers, for example, agarose-gel beads used as substrate are activated into the form of epoxide, and then a saccharide is bound to the epoxide. The method for activating agarose in the form of epoxide follows that of Sandberg L., et al. [Journal of Chromatography, 90, 87-98 (1974)].

The epoxide-activating agarose gel is stirred in a solution of a desired saccharide and the sugar-bound agarose bead is ground with a teflon homogenizer to make agarose fragments of about 10 μm.

The red blood cell models provided in this manner are appropriately used in the training course corresponding to the objective, depending upon the presence or absence of agglutinating reaction with antiserum model in correspondence to the red blood cell model.

Examples for constructing A, B, O and AB blood typing experiments using anti-A serum model and anti-B serum model are included in the blood typing training kit of the invention.

1) In the case of using polymers bound with saccharides as the red blood cell model and lectin solution as the antiserum model:

the A type red blood cell model consists of polymer (eg. agarose) bound with one or two or more saccharides selected from mannose. glucose. maltose, isomaltose, gentiobiose and maltotriose;

the B type red blood cell model consists of polymer bound with galactose or lactose;

the O type red blood cell model consists of polymer bound with N-acetylglucosamine, N-acetylgalactosamine or N-acetylmannosamine;

the AB type red blood cell model consists of polymer bound with one or two or more saccharides selected from mannose, glucose, maltose, isomaltose, gentiobiose, maltotriose and also with galactose or lactose. The solution of lectin among the third group of Mäkelä's classification (eg. *Canavalia ensiformis*) which selectively reacts to and agglutinates the polymer bound with mannose, glucose, maltose, etc. described above is used as the anti-A serum model; the solution of lectin among the second group of Mäkelä's classification (eg. *Arachis hypogaea* lectin) which selectively reacts to and agglutinates the polymer bound with galactose and lactose, is used as the anti-B serum model.

2) In the case of using polysaccharides in alkaline suspension as the red blood cell model and boric acid-containing liquid as the antiserum model:

The alkaline suspension of polysaccharides without bound saccharides or bound with saccharides is used as the red blood cell model and boric acid-containing liquid is used as the anti-B serum model, and the acidic suspension of the polysaccharides aforementioned is used as the O type red blood cell model.

3) In the case of using the granule bound with protein A or G as the red blood cell model and immunoglobulin G solution as the antiserum model:

The polymer (eg. agarose) in the form bound with protein A or G is used as the A or B type red blood cell model and immunoglobulin G (IgG) is used as the anti-A or anti-B serum model.

Among D-mannose, glucose, isomaltose, gentiobiose and maltotriose, which are bound to the polymers of the present invention, D-mannose is preferable. Furthermore, between galactose and lactose, lactose is preferable. Among the saccharides bound with the above A type red blood cell model and those bound with the above B type red blood cell model, D-mannose and lactose are preferable as the AB red blood cell model. N-acetylglucosamine, N-acetylgalactosamine, N-acetylmannosamine, etc., are used in the O type red blood cell models and N-acetyl-D-glucosamine is preferred.

However, other saccharides with affinity to lectin may be also used. The special reason why saccharides are made to bind to the surface of O type red blood cell model is to minimize the difference between the staining of intact agarose bead and that of sugar-bound agarose bead in the case of using red dye. Thus if other saccharides comply with this condition, they may be used as well.

Additionally, in order to give the appearance of blood in training experiments, the above red blood cell model is preferably stained into red with a red dye, for example, DYLON COLD A2l, manufactured by DYLON Company.

As for the lectins as the serum model of the invention, the solution of plant lectin is used. However, AB type serum model which does not agglutinate with red blood cell of any type does not contain lectin.

As for the relationship between the aforementioned red blood cell model and the saccharides bound thereto, anti-B serum model uses *Arachis hypogaea*-lectin solution with affinity to lactose, anti-A serum model uses *Canavalia ensiformis* with affinity to mannose and anti-AB serum model uses *Arachis hypogaea*-lectin with affinity to mannose as well as the solution of *Canavalia ensiformis* with affinity to D-mannose. Furthermore, as for the solvents in the present solution, 0.01 M phosphate buffered saline (P.B.S.) (pH 7.2) is preferably used, taking into consideration the optimum condition for lectin activity. $CaCl_2$ and $MnCl_2$ both of 10 mM are also preferably added to P.B.S.

In addition, other lectins may be also selected for use, based on their affinities to the saccharides bound to agarose as the red blood cell model.

The agglutinating experiments are carried out using the red blood cell and antiserum models in accordance with the present invention as will now be described.

Eight petri dishes (4 cm in diameter) are prepared; four of them are arranged horizontally and the other four are arranged underneath. The dishes on the above line are numbered 1 to 4 and those underneath are numbered 5 to 8 sequentially. The A type red blood cell model (agarose fragments bound with mannose) is dropped into petri dishes number 1 and 5; the B type red blood cell model (agarose fragment bound with lactose) is dropped into petri dishes number 2 and 6; the AB type red blood cell model is dropped into petri dishes number 3 and 7; the O type red blood cell model (activated agarose blocked with ethanolamine or agarose fragment bound with N-acetyl glucosamine) is dropped into petri dishes number 4 and 8.

Then, the anti-A serum model (*Canavalia ensiformis* solution) is put into the dishes number 1 to 4 and shaken, while anti-B serum model (*Arachis hypogaea* solution) is put into dishes number 5 to 8 and stirred.

After standing for about 1 minute, the agglutinating reaction can be visually observed in petri dishes number 1, 3, 6 and 7. Thus, the blood typing model experiments for A, B, AB and O blood types can be practiced quite easily and distinctively.

Quite similar results may be obtained in the above experiments, for example, even if 0.1 M boric acid solution adjusted to pH 6.0 is used as anti-B serum model, the suspension of agarose fragments with no sugar bound in 0.3 M $Na_2CO_3$ (pH 10.5) is used as the B type red blood cell model and the mannose-bound agarose fragment suspended in 0.3 M $Na_2CO_3$ solution of pH 10.5 is used as the AB type red blood cell model.

The lectins used in the serum models have two or more sugar binding sites in its molecules and they bind to the specific sugar structures present on the red blood cell model and cause agglutination.

According to the present invention, the lectin solution which binds the saccharides present on the surface of A type red blood cell model to cause agglutination is defined as the anti-A serum model. The lectin solution which binds to the saccharides present on the surface of B type red blood cell model to cause agglutination is defined as the anti-B serum model. The saccharides present on the O type red blood cell model are those which do not bind to the lectins used in anti-A or anti-B serum models, causing no agglutination.

Further, as for the granule such as agarose which can be suspended in water, the alkaline suspension (pH 6.9–12.0) thereof agglutinates with boric acid containing liquid, while the granule in acidic suspension (pH 2–6.8) for O type red blood cell model does not agglutinate.

Protein A or G present on the surface of red blood cell model agglutinates with immunoglobulin used for antiserum model.

Accordingly, in the case of experiments using the blood typing model of the present invention, the A type red blood cell model agglutinates with the anti-A serum model, the B type red blood cell model agglutinates with anti-B serum model and the AB type red blood cell model agglutinates with both the anti-A and anti-B serum models. The O type red blood cell model does not agglutinate with either anti-A or anti-B serum model. These actions enable the blood typing experiments to be practiced.

In the following, embodiments for preparing the red blood cell and serum models according to the invention are illustrated. The present invention is not limited to these examples.

EXAMPLE 1

1) Preparation of red blood cell model

Sepharose 4B Gel Bead [merchandise name of agarose gel manufactured by Pharmacia Fine Chemicals] is washed with distilled water on a glass filter and after draining the water off, 10 g of gel bead is taken and washed with 0.2 M sodium hydroxide (about 100 ml). The bead is mixed with 0.6M sodium hydroxide containing 0.2% sodium borohydroxide (10 ml) and 1,4-butanediol diglycidyl ether (10 ml) to react while shaking at 25° C. for 13 hours, in order to activate the gel into the epoxide form. Then, it is washed with distilled water and after draining the water off, the activated gel bead (10 g) is put into 0.1 N sodium hydroxide solution (20 ml) containing 5% D-mannose to react under shaking at 40° C. for 24 hours. The resulting sugar-bound gel is recovered on a glass filter and washed extensively with distilled water. Furthermore, it is washed three times interchangeably with 0.1 M acetate buffer (pH 4.0) containing 0.5 M sodium chloride and 0.1 M boric acid buffer (pH 8.0) containing 0.5 M sodium chloride. Then, after complete washing with distilled water, the resulting solution is put in 1 M ethanolamine of 500 ml in order to block the activated group at 4° C. for 24 hours and then it is extensively washed with distilled water on a glass filter. The gel is stained in a staining solution comprising DYLON COLD A21 2 mg/ml, fixing agent 3 mg/ml and sodium chloride 10 mg/ml at 30°-40° C. for 1 hour and washed with water and phosphate buffer (P.B.S. 0.4 M, sodium chloride 0.01 M, pH 7.4). Then, the resulting stained gel suspended in P.B.S. is ground with teflon homogenizer to obtain the A type red blood cell model.

D-glucose instead of D-mannose aforementioned may be used as the A type red blood cell model.

An equal amount of lactose or D-galactose instead of D-mannose described above may be used as the B type red blood cell model.

The AB type red blood cell model may be prepared using D-mannose and lactose, D-mannose and galactose, D-glucose and lactose or D-glucose and galactose, the amounts of all substances being equal to those described above.

The O type red blood cell model may be Sepharose gel itself, or the epoxidated form thereof, or Sepharose or the epoxide thereof bound with N-acetyl-D-glucosamine without affinity to lectin.

It may be obtained similarly with the exception of the use of an equal amount of N-acetyl-D-glucosamine.

2) Preparation of serum model

*Arachis hypogaea* (peanut) lectin (manufactured by E. Y. LABs INC.) in crude purification is dissolved in P.B.S. at a concentration of 200 mg/ml to obtain A type serum model.

Purified *Canavalia ensiformis* (manufactured by E. Y. LABs INC.) is dissolved in P.B.S. at a concentration of 1 mg/ml to obtain B type serum model.

The mixed solution comprising equal amounts of the *Arachis hypogaea* in P.B.S. solution and the *Canavalia ensiformis* in P.B.S. solution is used as O type serum model.

EXAMPLE 2

ABO blood type models may be constructed by using as A type red blood cell model, D-mannose-bound Sepharose gel bead prepared by the same process as in Example 1, by using as B type red blood cell model, the O type red blood cell model prepared by the same process as in Example 1 suspended in 0.3 M sodium carbohydrate (adjusted to pH 7.5 or more) and by using the A type red blood cell model suspended in 0.3 M sodium carbohydrate solution (adjusted to pH 7.5 or more) as AB type red blood cell model.

EXAMPLE 3

*Canavalia ensiformis* lectin (Con A) of 50 mg dissolved in 0.01 M PBS (pH 7.0, 10 ml) may be used as the anti-A serum model in Example 1. *Arachis hypogaea* lectin (PNA) of 30 mg dissolved in 0.01 M PBS (pH 7.0, 10 ml) may be used as the anti-B serum model.

EXAMPLE 4

In the case of using the red blood cell model of Example 2, the mannose-bound Sepharose bead prepared following the process in Example 1 may be used as the A type red blood cell model and 0.1 M boric acid solution added to 0.01 M PBS (pH 6.0) may be used as the anti-B serum model.

EXAMPLE 5

As the process in Example 1, the epoxidated Sepharose bead bound with protein A in an amount equal to that of D-mannose is used as the B type red blood cell model and the above bead bound with equal amounts of D-mannose and protein A is used as the AB type red blood cell model. In this case, the Sepharose bead bound with D-mannose is used as the A type red blood cell model. Furthermore, *Canavalia ensiformis* (con A) solution is used as the anti-A serum model and immunoglobulin G (5 mg/ml in 0.01 M PBS, pH 7.0) is used as the anti-B serum model.

EXAMPLE 6

In the constitution of ABO blood type model using the A, B, AB and O type red blood cell models, any one or combined solution of lenzyl lectin (*Lens culinaris*), green peas lectin (*Pisum sativum*), furze lectin (*Ulex europeus*) and wheat germ lectin (*Triticum vulgaris*), is used as the anti-A serum model; any one or combined solution of breadfruit phytohemagglutinin (*Arotocarpus integrifolia*), mushroom lectin (*Agaricus bisporus*), bandeira bean phytohemagglutinine (*Bandeiraea simplicifolia*), soy bean lectin (*Glycine max*), kidney bean lectin (*Phaseolus vulgaris*), castor-oil plant lectin (*Ricinus communis*) and potato lectin (*Solanum tuberosum*), is used. The names of plants are shown in parenthesis.

According to the invention, the training experiments for blood typing which have conventionally been carried out using human blood are now made up of materials utilizing saccharides and lectins both of which are easily available, simple to use and safe. Also this invention provides a blood typing kit useful in observation of the agglutinating reaction in the same manner as in the case of using human blood in the learning process. According to the present invention, the wide use of the training kit enables effective and adequate biological education in high school.

What is claimed is:

1. A blood typing training kit including red blood cell models and anti-serum models comprising:
   a support means having an A red blood cell model with an anti-A serum model counterpart and a B red blood cell model with an anti-B serum model counterpart wherein each of said A/anti-A and B/anti-B combinations are selected from the group consisting of:
   a) the red blood cell model of a natural or synthetic water-insoluble polymer bound with a saccharide selected from the group consisting of mannose, glucose, maltose, isomaltose, gentiobiose, maltotriose and the antiserum model comprising one or two or more phytohemagglutinins in the third group of Mäkelä's classification;
   b) the red blood cell model of a natural or synthetic water-insoluble polymer bound with galactose or lactose and the antiserum model comprising one or two or more phytohemagglutininins in the second group of Mäkelä's classification;

c) the red blood cell model of a water-insoluble saccharide in alkaline suspension and the antiserum model of boric acid containing liquid; and d) the red blood cell model of a natural or synthetic water-insoluble polymer bound with protein A or G and the antiserum model of immunoglobulin G.

2. The kit of claim 1, wherein said A/anti-A and B/anti-B combinations comprise:

a) the red blood cell model of a natural or synthetic water-insoluble polymer bound with a saccharide selected from the group consisting of mannose, glucose, maltose, isomaltose, gentiobiose, maltotriose and the antiserum model comprising one or two or more phytohemagglutinins in the third group of Mäkelä's classification; and b) the red blood cell model of a natural or synthetic water-insoluble polymer bound with galactos or lactose and the antiserum model comprising one or two or more phytohemagglutinins in the second group of Mäkelä's classification, respectively;

and said kit further comprises:

an O red blood cell model selected from the group consisting of:

a) a natural or synthetic water-insoluble polymer, b) an epoxidated form of a natural or synthetic water-insoluble polymer, and c) a polymer bound with a saccharide selected from the group consisting of N-acetylgalacyosamine, N-acetylglycosamine and N-acetylmannosamine;

and an AB red blood cell model comprising a natural or synthetic polymer bound with a saccharide selected from the group consisting of mannose, glucose, maltose, isomaltose, and maltotriose, and also bound with a saccharide selected from the group consisting of galactose and mannose.

3. The kit of claim 1, wherein said A/anti-A and B/anti-B combinations comprise:

a combination selected from the group consisting of:

a) the red blood cell model of a natural or synthetic water-insoluble polymer bound with a saccharide selected from the group consisting of mannose, glucose, maltose, isomaltose, gentiobiose, maltotriose and the antiserum model comprising one or two or more phytohemagglutinins in the third group of Mäkelä's classification, or b) the red blood cell model of a natural or synthetic water-insoluble polymer bound with galactose or lactose and the antiserum model comprising one or two or more phytohemagglutinins in the second group of Mäkelä's classification; and c) the red blood cell model of a water-insoluble saccharide in alkaline suspension and the antiserum model of boric acid containing liquid;

and said kit further comprises:

an O red blood cell model comprising a natural or synthetic water-insoluble polymer in acidic suspension, and an AB red blood cell model comprising an alkaline suspension of a natural or synthetic polymer bound with a saccharide selected from the group consisting of mannose, glucose, maltose, isomaltose and maltotriose when group (a) is used as an A/anti-A combination and an alkaline suspension of a natural or synthetic polymer bound with a saccharide selected from the group consisting of galactose and mannose when group (b) is used as an A/anti-A combination.

4. The kit of claim 1, wherein said A/anti-A and B/anti-B combinations comprise:

a combination selected from the group consisting of:

a) the red blood cell model of a natural or synthetic water-insoluble polymer bound with a saccharide selected from the group consisting of mannose, glucose, maltose, isomaltose, gentiobiose, maltotriose and the antiserum model comprising one or two or more phytohemagglutinins in the third group of Mäkelä's classification, or b) the red blood cell model of a natural or synthetic water-insoluble polymer bound with galactose or lactose and the antiserum model comprising one or two or more phytohemagglutinins in the second group of Mäkelä's classification; and d) the red blood cell model of a natural or synthetic water-insoluble polymer bound with protein a or G and the antiserum model of immunoglobulin G, respectively;

and said kit further comprises:

an O red blood cell model selected from the group consisting of:

a) a natural or synthetic water-insoluble polymer, b) an epoxidated form of a natural or synthetic water-insoluble polymer, and c) a polymer bound with a saccharide selected from the group consisting of N-acetylgalactosamine, N-acetylglucosamine and N-acetylmannosamine;

and an AB red blood cell model comprising a natural or synthetic water-insoluble polymer bound with a saccharide selected from the group consisting of mannose, glucose, maltose, isomaltose, gentiobiose and maltotriose when group (a) is used as an A/anti-A combination and a natural or synthetic water-insoluble polymer bound with a saccharide selected from the group consisting of galactose and lactose and also bound with a protein selected from the group consisting of protein A and protein G when group (b) is used as an A/anti-A combination.

5. The kit of claims 1, 2, 3, or 4, wherein said natural or synthetic water-insoluble polymer is selected from the group consisting of agarose, Sepharose, Sephadex, cellulofine, alginate, tamarind, polysaccharide, gelatin and xanthan gum.

* * * * *

UNITED STATES PATENT AND TRADEMARK OFFICE
CERTIFICATE OF CORRECTION

PATENT NO. : 5,055.259

DATED : October 8, 1991

INVENTOR(S) : TSUTOMU INQUE ET AL

It is certified that error appears in the above-identified patent and that said Letters Patent is hereby corrected as shown below:

> On the title page, Item [73], Assignee's name from "Sanraku Incorporated" to --Mercian Corporation--.

Signed and Sealed this

Ninth Day of March, 1993

*Attest:*

STEPHEN G. KUNIN

*Attesting Officer*     *Acting Commissioner of Patents and Trademarks*